United States Patent
Getsy

(10) Patent No.: US 12,521,004 B2
(45) Date of Patent: Jan. 13, 2026

(54) TUBE RESERVOIR CHEMICAL DOSING SYSTEM

(71) Applicant: American Sterilizer Company, Mentor, OH (US)

(72) Inventor: Andrew Paul Getsy, Kirtland, OH (US)

(73) Assignee: American Sterilizer Company, Mentor, OH (US)

( * ) Notice: Subject to any disclaimer, the term of this patent is extended or adjusted under 35 U.S.C. 154(b) by 401 days.

(21) Appl. No.: 18/342,875

(22) Filed: Jun. 28, 2023

(65) Prior Publication Data

US 2024/0000304 A1 Jan. 4, 2024

Related U.S. Application Data

(60) Provisional application No. 63/357,677, filed on Jul. 1, 2022.

(51) Int. Cl.
*A61B 1/12* (2006.01)
*A61L 2/18* (2006.01)
*A61L 2/24* (2006.01)

(52) U.S. Cl.
CPC ............... *A61B 1/125* (2013.01); *A61L 2/18* (2013.01); *A61L 2/24* (2013.01); *A61L 2202/14* (2013.01); *A61L 2202/15* (2013.01); *A61L 2202/17* (2013.01); *A61L 2202/24* (2013.01)

(58) Field of Classification Search
CPC ............... A61B 1/125; A61L 2/18; A61L 2/24
See application file for complete search history.

(56) References Cited

U.S. PATENT DOCUMENTS

| | | | |
|---|---|---|---|
| 6,068,815 A | 5/2000 | Oberleitner et al. |
| 6,910,377 B1 | 6/2005 | Richter et al. |

FOREIGN PATENT DOCUMENTS

| | | |
|---|---|---|
| EP | 1757313 A1 | 2/2007 |
| WO | 2017141206 A1 | 8/2017 |

OTHER PUBLICATIONS

PCT/US2023/069224; PCT International Search Report and Written Opinion of the International Searching Authority mailed Oct. 6, 2023.

*Primary Examiner* — Sean E Conley
(74) *Attorney, Agent, or Firm* — Renner, Otto, Boisselle & Sklar, LLP

(57) ABSTRACT

A medical device processor includes a chemical dosing system including a supply tube extending along a length between a first and second end. A pump is coupled to the supply tube downstream from the first end and configured to pump fluid in the tube. A bubble detector is coupled to the supply tube downstream from the first end, wherein an inner volume of the supply tube between the bubble detector and the second end is equal to or greater than a volume of a dose of liquid to be pumped from the chemical dosing system in a given dose. A controller is configured to run the pump for a predetermined period of time; detect the presence of one or more bubbles in the supply line based on measurement by the bubble detector; upon detection, continue to run the pump for the remainder of the predetermined time; and issue a notification.

20 Claims, 5 Drawing Sheets

TUBE RESERVOIR CHEMICAL DOSING SYSTEM

This application claims priority of United States of America Application No. 63/357,677, filed Jul. 1, 2022, which is hereby incorporated herein by reference in its entirety.

FIELD OF INVENTION

This application relates generally to a chemical dosing system, and more particularly to a tube reservoir chemical dosing system of a medical device processor and a method of operating such a dosing system.

BACKGROUND

Medical device processors, also referred to as medical instrument processors, are widely used in various health care settings and are typically associated with cleaning, high-level disinfection, or sterilization of medical instruments. An example of such a processor is an automated endoscope reprocessor (AER) used for reprocessing endoscopes, such as duodenoscopes, and endoscope accessories. AERs are designed to kill microorganisms in or on reusable endoscopes by exposing their outside surfaces and interior channels to liquid chemical sterilant or high-level disinfectant solutions. Some AER's are also designed to clean reusable endoscopes by exposing their outside surfaces and interior channels to detergent.

Medical device processors typically include one or more containers for holding detergent or other cleaning or decontamination chemistries to be used in a cleaning, high-level disinfection, or sterilization cycle. A pump draws the chemistry out of the container and into the processor. Because the container holds a limited quantity of chemistry, a sensor in the container such as a float switch is typically used to notify the processor of the system when the level in the container has reached a certain level for purposes of replacement of the container.

With this approach, a considerable amount of chemistry is left in the container when the float switch indicates that the chemistry container is empty. This problem is due, in part, to the physical size of the float switch, and the vertical space required to trigger the switch. This vertical space equates to volume of liquid left in the container at "empty". Also, the float switch approach of indicating empty when liquid is present in the container is needed to prevent air from being sucked into the line and thereby altering the amount of chemistry that is pumped into the system. Accordingly, the container is not able to be completely emptied while still allowing the user to complete the cycle the container empties on.

Accordingly, there remains a need for further contributions in this area of technology.

SUMMARY OF INVENTION

The application relates to a tube reservoir chemical dosing system. The system is configured to empty the chemical supply container while also allowing the final cycle to receive the correct amount of chemistry. This method reduces or eliminates waste by preventing the need to leave a considerable portion of chemistry at the bottom of the container to ensure proper dosing volume. The dosing system uses a selected length of tubing with a certain size inner diameter to store a predetermined volume of fluid inline in a chemical dosing system. This allows for the dosing process to be completed for the cycle during which the chemical supply container is emptied.

The chemical dosing system also allows for easy priming and wash out due to it being inline and made of tubing with an inner diameter that allows for no mixing of the fluid and air when the supply container reaches empty.

In accordance with one aspect of the present disclosure, a medical device processor, includes: a chemical dosing system including: a supply tube extending along a length between a first end and a second end, the first end of the supply tube configured to receive a liquid; a pump coupled to the supply tube downstream from the first end and configured to pump fluid in the tube from the first end to the second end; a bubble detector coupled to the supply tube downstream from the first end, wherein an inner volume of the supply tube between the bubble detector and the second end is equal to or greater than a volume of a dose of liquid to be pumped from the chemical dosing system in a given dose; and a controller coupled to the bubble detector and the pump, wherein the controller is configured to: run the pump for a predetermined period of time; detect the presence of one or more bubbles in the supply line during the predetermined time based on measurement by the bubble detector; upon detection of the presence of one or more bubbles in the supply line, continue to run the pump for the remainder of the predetermined time; and issue a notification to replace a source of the liquid after completion of the predetermined period time.

In some embodiments, the controller is further configured to: subsequent to receipt of notification that the source of the liquid has been replaced, run the pump until the presence of liquid is detected in the supply line based on measurement by the bubble detector; continue to run the pump for a second predetermined time upon detection of the presence of the liquid; and stop the pump upon completion of the second predetermined time.

In some embodiments, the medical device processor further includes a drawtube configured to be disposed in a container containing the liquid.

In some embodiments, the medical device processor further includes a removable container for configured to contain the fluid.

In some embodiments, the pump is downstream the bubble sensor and arranged between the bubble sensor and the second end.

In some embodiments, the pump is a peristaltic pump.

In some embodiments, the medical device processor further includes a reservoir coil in which a portion of the supply tube downstream the bubble detector is coiled.

In some embodiments, the reservoir coil is downstream the pump.

In some embodiments, an inner diameter of the supply tube is in a range of 1/16 inch to 1/4 inch.

In some embodiments, the medical device processor further includes: a manifold coupled to the second end of the chemical dosing system; and a basin coupled to the manifold.

In some embodiments, the controller is further configured to execute a cleaning cycle in which the chemical dosing system delivers a dose of liquid for the cycle.

In some embodiments, the controller is further configured to execute a high-level disinfection cycle in which the chemical dosing system delivers a dose of liquid for the cycle.

In some embodiments, the controller is further configured to execute a sterilization cycle in which the chemical dosing system delivers a dose of liquid for the cycle.

In accordance with another aspect of the present disclosure, a method of providing a chemical dose from a chemical dosing system in a medical device processor, the chemical dosing system including: a supply tube extending along a length between a first end and a second end, the first end of the supply tube configured to receive a liquid; a pump coupled to the supply tube downstream from the first end and configured to pump fluid in the tube from the first end to the second end; a bubble detector coupled to the supply tube downstream from the first end, wherein an inner volume of the supply tube between the bubble detector and the second end is equal to or greater than a volume of a dose of liquid to be pumped from the chemical dosing system in a given dose; the method including: running the pump for a predetermined period of time; detecting the presence of one or more bubbles in the supply line during the predetermined time based on measurement by the bubble detector; upon detection of the presence of one or more bubbles in the supply line, continuing to run the pump for the remainder of the predetermined time; and issuing a notification to replace a source of the liquid after completion of the predetermined period time.

In some embodiments, the method further includes: subsequent to receipt of notification that the source of the liquid has been replaced, running the pump until the presence of liquid is detected in the supply line based on measurement by the bubble detector; continuing to run the pump for a second predetermined time upon detection of the presence of the liquid; and stopping the pump upon completion of the second predetermined time.

In some embodiments, the pump is downstream the bubble sensor and arranged between the bubble sensor and the second end.

In some embodiments, the method further includes a reservoir coil in which a portion of the supply tube downstream the bubble detector is coiled.

In some embodiments, the method further includes executing a cleaning cycle in which the chemical dosing system delivers a dose of liquid for the cycle.

In some embodiments, the method further includes executing a high-level disinfection cycle in which the chemical dosing system delivers a dose of liquid for the cycle.

In some embodiments, the method further includes executing a sterilization cycle in which the chemical dosing system delivers a dose of liquid for the cycle.

The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
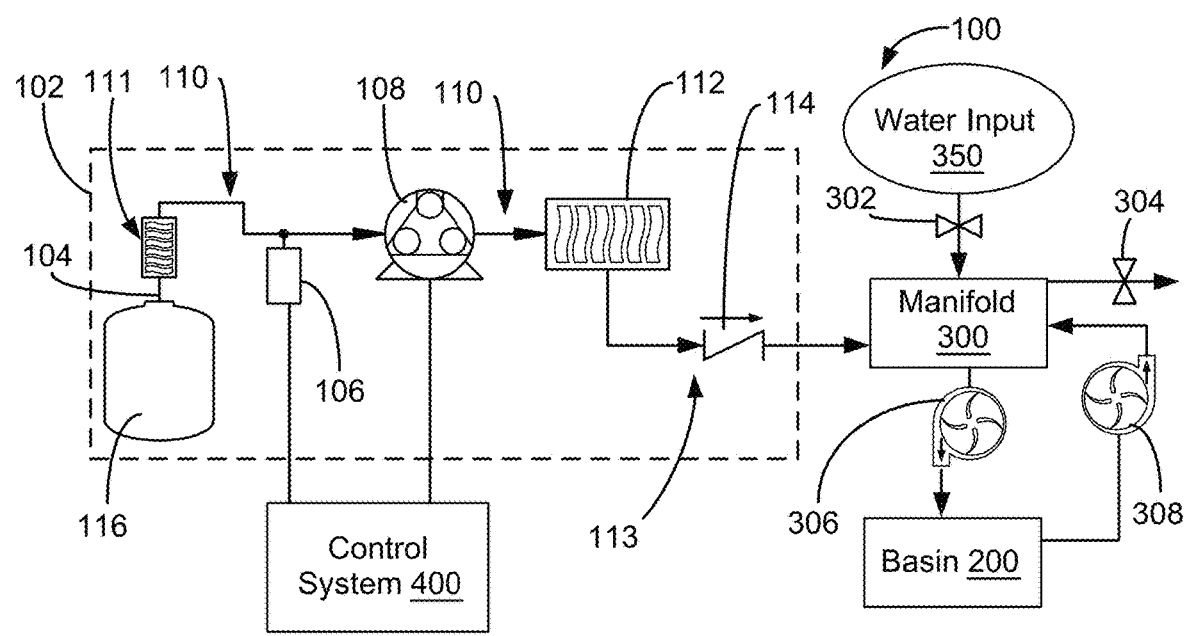
FIG. 1 is a schematic view of an exemplary tube reservoir dosing system as part of a medical device processor.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Turning now to the drawings, and initially to FIG. 1, an exemplary medical device processor is shown at 100. The medical device processor 100 is designed to clean and/or decontaminate one or more medical devices inserted into the medical device processor. The medical device processor 100 may be any type of system for cleaning and/or decontaminating medical devices or instruments, for example, by a cleaning process, high-level disinfection process, and/or sterilization process. In an exemplary embodiment, the medical device processor 100 is an automated endoscope reprocessor (AER) used for reprocessing endoscopes, such as duodenoscopes, and endoscope accessories.

In the exemplary embodiment shown, the medical device processor 100 includes a basin 200, a manifold 300, a chemical dosing system 102, and a control system 400.

The basin 200 is configured to house the one or more medical devices for purposes of performing the cleaning, high-level disinfecting, and/or sterilizing process. The basin 200 may have any suitable shape for retaining the one or more medical devices in a predetermined position during the process. The basin 200 may have an opening for receiving a medical device for processing and a lid or door for enclosing the interior volume of the basin from the environment. The basin 200 may include one or more spray bars and/or one or more nozzles for spraying the one or more medical devices with detergent, high-level disinfectant solution, or chemical sterilant during the cleaning process, high-level disinfecting process, and/or sterilizing process. The basin may include one or more connectors for connecting interior channels of a medical device to a source of high-level disinfectant solution or chemical sterilant. In an example in which the medical device is an endoscope, the endoscope may be placed in the basin and interior channels of the endoscope may be respectively connected to connectors in the basin. During the cleaning process, high-level disinfecting process, and/or sterilizing process, the outside surfaces and interior channels of the endoscope may be exposed to detergent, high-level disinfectant solution, and/or liquid chemical sterilant to clean surfaces of the endoscope and to kill microorganisms in or on the endoscope. The basin 200 may also include a drain for draining the detergent, high-level disinfectant solution, or chemical sterilant from the basin. The liquid exiting the basin via the drain may in some embodiments are to be recirculated to the basin 200 (e.g., via manifold 300) during a given processing cycle. The liquid exiting the basin via the drain may also be discarded upon completion of a given cycle.

The manifold 300 is configured to direct the flow of fluid to the basin 200. For example, the manifold may be connected to the respective spray bar(s), nozzle(s), and/or connector(s) for providing detergent, high-level disinfectant solution, and/or liquid chemical sterilant. The manifold 300 may also be connected to the basin drain for purposes of circulating the detergent, high-level disinfectant solution, and/or liquid chemical sterilant during a cleaning process, high-level disinfecting process, and/or sterilizing process. The manifold 300 may be connected to the chemical dosing system 102 for purposes of receiving the detergent, high-level disinfectant solution, and/or liquid chemical sterilant. The manifold 300 may be connected to a water input 350 for purposes of inputting water from a water source. The detergent, high-level disinfectant solution, and/or liquid chemical sterilant may be mixed in the manifold 300 with the water.

One or more pumps 306, 308 and valves 302, 304 may be used to control the flow of detergent, high-level disinfectant solution, and/or liquid chemical sterilant in the manifold 300 and basin 200. In the example shown, valve 302 controls flow of water into the manifold, and valve 304 controls flow of liquid from the manifold out of the medical device processor 100. Pump 306 controls flow of liquid from the manifold 300 to the basin, and pump 308 controls flow of liquid from the basin to the manifold. It will be appreciated that in other embodiments, the medical device processor 100 may have any suitable arrangement of valves and pumps to effectuate the flow of liquid among the basin 200 and manifold 300 during a given cycle. The overall operation of the medical device processor 100, including the one or more pumps and valves may be controlled by control system 400. This control may effectuate, for example, any suitable cleaning, high-level disinfecting, sterilizing, and/or rinsing process.

The chemical dosing system 102 is configured to provide a predetermined amount of liquid for use in a cleaning process, high-level disinfecting process, and/or sterilizing process. The liquid may be, for example, a detergent, high-level disinfectant solution, and/or liquid chemical sterilant, depending on the process. The chemical dosing system 102 includes a drawtube 104, supply tube 110, bubble sensor 106, pump 108, and reservoir coil 112. The drawtube 104 may be disposed in a removable supply container 116 that may contain the liquid. In the example shown, a check valve 114 is also included to prevent backflow from the manifold 300.

The supply tube 100 extends along a length between a first end 111 and a second end 113, the first end of the supply tube configured to receive a liquid.

Figure 2:
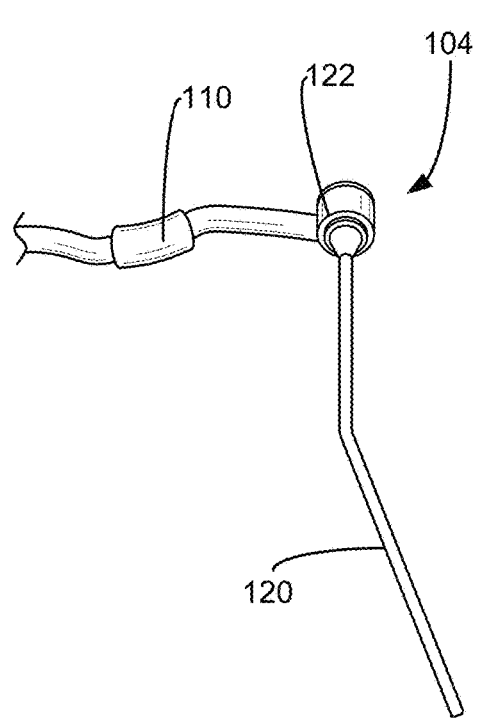
FIG. 2 is a schematic view of an exemplary drawtube.
Figure 3:
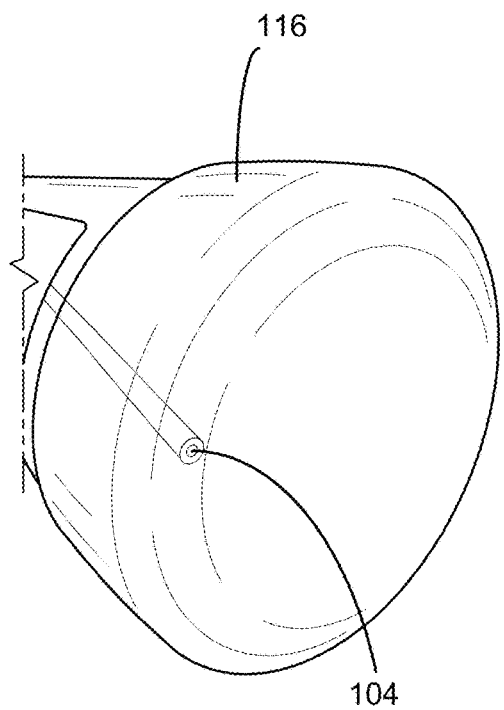
FIG. 3 is a schematic view of a drawtube inserted in a container.

A drawtube 104 is configured to be disposed in a container containing the liquid. The container 116 may be a removable/replaceable container. With additional reference to FIGS. 2 and 3, the drawtube 104 includes a straw portion 120 that is connected at one end (proximal end) to a cap 122. The length and angle of the straw is configured such that the end of the straw distal the cap 122 is at the bottom of the container when the cap 122 is provided in the opening of the container. The supply tube is attached to the cap 122 of the drawtube 104.

Figure 4:
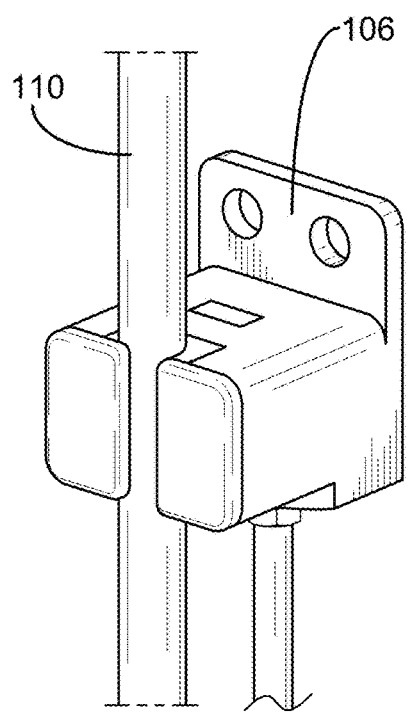
FIG. 4 is a schematic view of an exemplary bubble detector.

A bubble detector 106 is coupled to the supply tube 110 downstream from the first end 111. The bubble detector is located along the length of the supply tube 110 such that an inner volume of the supply tube between the bubble detector and the second end is equal to or greater than a volume of a dose of liquid to be pumped from the chemical dosing system in a given dose. With additional reference to FIG. 4, the supply tube 110 travels through a non-intrusive optical bubble detector 106 that will notify the control system when the chemistry supply container is empty. In some embodiments, the bubble detector 106 is an optical sensor. In some embodiments, the bubble detector 106 is an ultrasonic sensor. Using this type of sensor instead of a float switch reduces the complexity of the drawtube. Electronics no longer sit in the chemistry container, and the drawtube can also be formed so that the pick-up point of the drawtube is located at the lowest point (usually the outer rim) of the bottom of the chemistry container which allows for a more complete drain.

Figure 5:
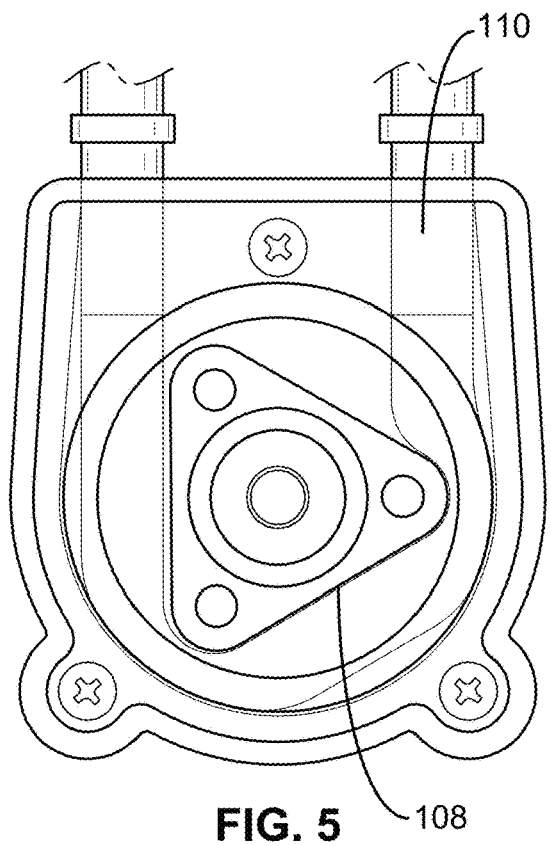
FIG. 5 is a schematic view of an exemplary pump.

A pump 108 is coupled to the supply tube downstream from the first end 111 and is configured to pump fluid in the supply tube from the first end 111 to the second end 113. In the embodiment shown, the pump 108 is downstream the bubble sensor and arranged between the bubble sensor and the second end. In some embodiments, at least a portion of the supply tube 110 is a flexible squeeze tube. The supply tube 110 passes through the pump 108, which is used to move the liquid. FIG. 5 shows an exemplary pump 108 embodied as a peristaltic pump. In other embodiments, a different style of pump may be used.

At the exit of the peristaltic pump, the supply tube is provided with a selected inner diameter and length. These dimensions are chosen to provide a volume at least as much as a single dose required by the system. This portion of the supply tube 110 may be referred to as a reservoir tube. In some embodiments, the dimensions are chosen to provide a volume that is the same as a single dose required by the system. In other embodiment, the dimensions are chosen to provide a volume that is no more than 15% more than a single dose required by the system. In other embodiment, the dimensions are chosen to provide a volume that is no more than 10% more than a single dose required by the system. In other embodiment, the dimensions are chosen to provide a volume that is no more than 5% more than a single dose required by the system.

Figure 6:
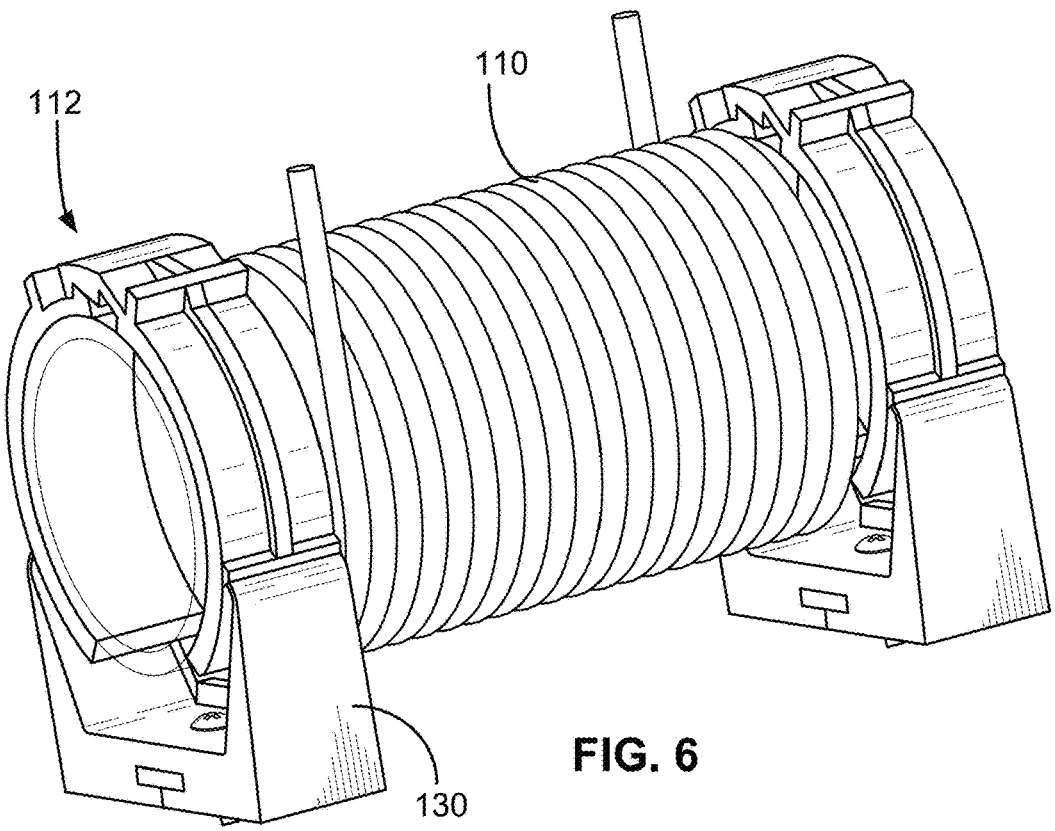
FIG. 6 is a schematic view of an exemplary supply tube provided in a coiled arrangement.

In the embodiment shown, and with additional reference to FIG. 6, at least a portion of the supply tube 110 downstream the pump 108 is wrapped into a coil. As shown, a housing 130 is provided around which the tube may be wrapped. As such, the supply tube is provided downstream the pump 108 and the bubble detector 106, which includes the coil wrap, may also be referred to as a reservoir coil. It will be appreciated, however, that in other embodiments, the reservoir tube may be wrapped or arranged in a different manner so long as the tube does not get pinched, kinked, or excessive head pressure is not added (great than 1 ft of head).

Figure 7:
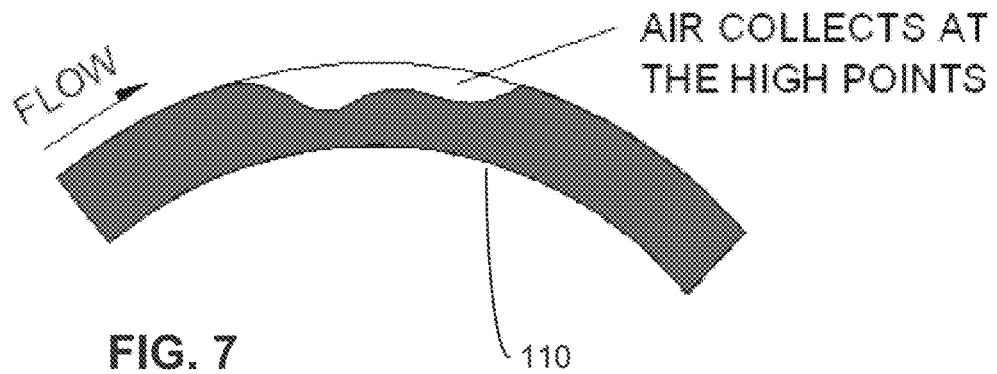
FIG. 7 is a schematic view of a portion of a tube in the coiled arrangement.

The inner diameter of the supply tube 110 is provided so that the air is not provided in the supply tube. It is important to choose the correct inner diameter for the reservoir tubing. This is due to air being able to mix, collect at high points, and get passed the fluid in the tube if the inner diameter is too large. FIG. 7 exemplifies collection of air at high points in a situation where inner diameter of the tube is too large. Using a tubing diameter that is too large allows air entanglement, making it impossible to completely fill and/or prime the system at set up. The wrong diameter tubing will also make it impossible to dose the correct amount when the chemistry supply container is emptied, and the peristaltic pump begins to draw in air. It was found that selecting the appropriate inner diameter for the tubing is related to the fluid's viscosity, flow rate, and chemistry transfer method. In some embodiments, a tubing inner diameter of ⅛ inch is used. In other embodiments, a tubing inner diameter is in the range of 1/16 inch to ¼ inch. In other embodiments, a tubing inner diameter is in the range of 1/16 inch to ⅜ inch. The appropriate inner diameter allows the used chemistry to completely fill the tubing, pushing all air out as the tube is filled. The diameter was also chosen so that it is not so small that the back pressure caused by the tubing is too large for the peristaltic pump to effectively move the chemistry through the length of tubing necessary to dose the correct volume to the processor.

It will be appreciated that in some embodiments of the medical device processor 100, more than one instance of the chemical dosing system 102 may be included. Each respective chemical dosing system 102 may provide a respective detergent, high-level disinfectant solution, or liquid chemical sterilant. In some embodiments, more than one instance of the chemical dosing system 102 may be included where a detergent, high-level disinfectant solution, or liquid chemical sterilant is a two-part detergent, high-level disinfectant solution, or liquid chemical sterilant.

It will also be appreciated that in some embodiments in which the medical device processor 100 includes a cleaning process and a high-level disinfecting process and/or sterilizing process, the medical device processor 100 may include one or more chemical dosing systems that differs from the chemical dosing system 102 shown in FIG. 1.

Figure 8:
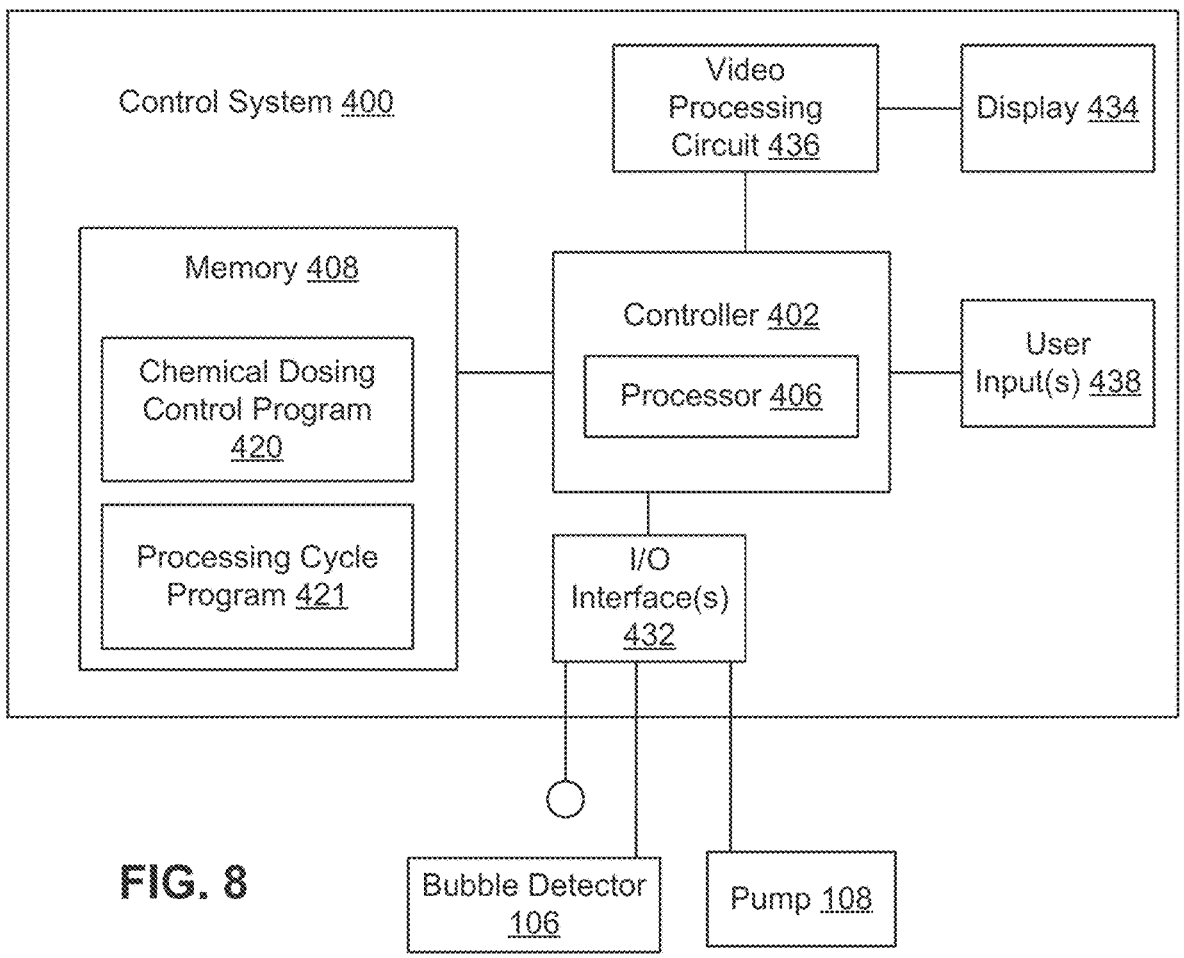
FIG. 8 is a schematic view of an exemplary control system.

With continued reference to FIG. 1 and additional reference to FIG. 8, operation of the chemical dosing system 102 is controlled by the control system 400. Components of the chemical dosing system 102, such as the bubble sensor and the pump, are connected to a controller 402 of the control system 400.

The controller 402 is configured to carry out overall control of the functions and operations of the control system 400. The controller 402 may include a processor 406, such as a central processing unit (CPU), microcontroller, or microprocessor. The processor 406 executes code stored in a memory (not shown) within the controller 402 and/or in a separate memory, such as the memory 408, in order to carry out operation of the chemical dosing system. As described above, the processor may also carry out overall operation of the medical device processor.

FIG. 8 shows an example in which a chemical dosing control program 420 and a processing cycle program 421 are stored in the memory 408. These programs may each be embodied in the form of executable logic routines (e.g., lines of code, software programs, etc.) that are stored on a non-transitory computer readable medium (e.g., the memory 408) and executed by the controller 402 (e.g., using the processor 406). The chemical dosing control program 420 may be executed by the controller to control operation of the chemical dosing system (e.g., a chemical dosing process as described below with respect to FIG. 12 and/or a chemical dosing system priming process as described below with respect to FIG. 9). For example, the chemical dosing control program 420 may be executed by the controller to run the pump for a predetermined period of time; detect the presence of one or more bubbles in the supply line during the predetermined time based on measurement by the bubble detector; upon detection of the presence of one or more bubbles in the supply line, continue to run the pump for the remainder of the predetermined time; and issue a notification to replace a source of the liquid after completion of the predetermined period time. In another example, the chemical dosing control program 420 may be executed by the controller to, subsequent to receipt of notification that the source of the liquid has been replaced, run the pump until the presence of liquid is detected in the supply line based on measurement by the bubble detector; continue to run the pump for a second predetermined time upon detection of the presence of the liquid; and stop the pump upon completion of the second predetermined time.

The processing cycle program 421 may be executed by the controller to control overall operation of the medical device processor to implement a cleaning process, high-level disinfecting process, and/or sterilizing process. The chemical dosing control program 420 may be executed in conjunction with or separate from execution of the processing cycle program 421. For example, the processing cycle program 421 may be executed by the controller to execute a cleaning cycle in which the chemical dosing system delivers a dose of liquid for the cycle. As another example, the processing cycle program 421 may be executed by the controller to execute a high-level disinfection cycle in which the chemical dosing system delivers a dose of liquid for the cycle. As another example, the processing cycle program 421 may be executed by the controller to execute a sterilization cycle in which the chemical dosing system delivers a dose of liquid for the cycle.

The memory 408 may be, for example, one or more of a buffer, a flash memory, a hard drive, a removable media, a volatile memory, a non-volatile memory, a random access memory (RAM), or other suitable device. In a typical arrangement, the memory 408 may include a non-volatile memory for long term data storage and a volatile memory that functions as system memory for the controller 402. The memory 408 may exchange data with the controller 402 over a data bus. Accompanying control lines and an address bus between the memory 408 and the controller 402 also may be present. The memory 408 is considered a non-transitory computer readable medium.

The control system 400 may further include one or more input/output (I/O) interface(s) 432. The I/O interface(s) 432 may be in the form of one or more electrical connectors and may connect the controller 402 to one or more sensors, pumps, motors, valves, or other components. For example, as shown, the I/O interface(s) 432 is connected to the bubble detector 106 and the controller 402 may receive and process a signal received from the bubble sensor via the I/O interface. As also shown, the I/O interface(s) 432 connect the controller to the pump and the controller 402 may control operation of the pump.

The control system 400 may include a display 434. In some embodiments, the display 434 can display information such as the state/status of the container and reservoir, warnings, etc. The display 434 may be a lighted display (e.g., a backlit liquid-crystal display (LCD) or organic light-emitting diode (OLED) display). The display 434 may be coupled to the controller 402 by a video processing circuit 436 that converts image and/or video data to an image and/or video signal used to drive the display 434. The video processing circuit 436 may include any appropriate buffers, decoders, video data processors and so forth. The control system 400 may include one or more user inputs 438 for receiving user input for controlling operation of the control system 400. Exemplary user inputs 438 include, but are not limited to, a touch input that overlays the display 434 for touch screen functionality, one or more buttons such as those included on the handle or in a different location, and so forth. The one or more user inputs 438 may, for example, allow a user to confirm that user action has been taken in response a warning or prompt issued and displayed on the display.

Figure 9:
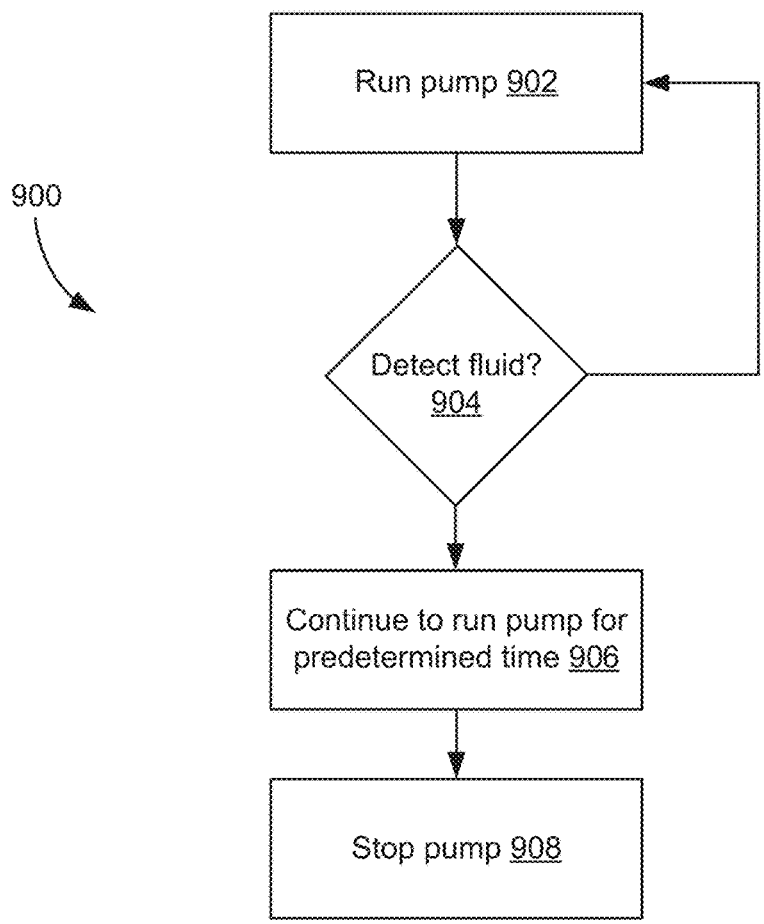
FIG. 9 is a flowchart showing an exemplary chemical dosing system priming process.

FIG. 9 is a flowchart showing an exemplary priming process 900 for filling an empty or partially empty tube. This process may be executed, for example, when the dosing system is first used the tubing starts out empty; or where a new container has been installed in response to bubbles being detected. Prior to commencement of the process, a container containing a liquid to be used in the chemical dosing is placed in the processor and the drawtube is placed in that container.

Figure 10:
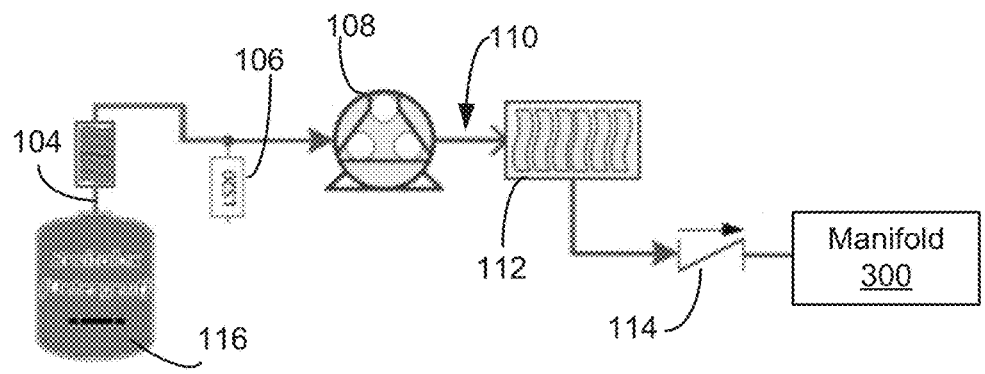
FIGS. 10 and 11 are schematic views showing exemplary states of fluid in the chemical dosing system.
Figure 11:
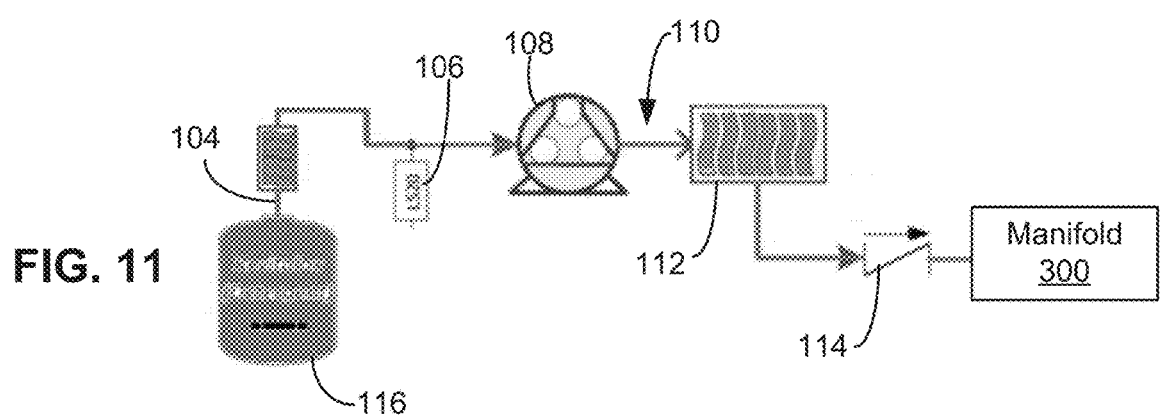

At step 902, the pump is run, which results in the pulling of chemistry from the container through the drawtube. FIG. 10 schematically shows the chemical dosing system 102 at the point where the fluid is being pulled from the container. At step 904, it is determined whether fluid is detected. The presence of fluid is detected by the bubble detector. If no (N), the process returns to step 902 and the pump continues to run. The pump runs until the fluid is detected by the bubble detector. Accordingly, once fluid is detected (Y), the process proceeds to step 906, where the pump continues to run for a predetermined amount of time, filling the rest of the tubing. The volume of the supply tubing up to the injection port is known based on the length and diameter of the tubing. Also, the rate at which the pump is operated is known. As such, the predetermined time is an amount of time in which the volume of the supply tube downstream the pump (including the reservoir coil) up to the processor plumbing injection port is filled with fluid. FIG. 11 schematically shows the chemical dosing system 102 after being run for the predetermined amount of time. In some embodiments, the amount of time provides for a volume of fluid equal to the volume of the supply tube downstream the pump up to the processor plumbing injection port to be pumped by the pump. In other embodiments, the amount of time provides for a volume of fluid greater than the volume of the supply tube downstream the pump up to the processor plumbing injection port to be pumped by the pump. In such embodiments, the controller 402 may control one or more valves of the system to dispose of the excess fluid being pumped. For example, the controller 402 may open valve 304, which may allow for excess fluid injected into the manifold 300 to exit the system 100.

At step 908, the pump is stopped. The tube downstream the pump up to the processor plumbing injection port (the reservoir tube) is filled with fluid. This volume of fluid stored in the reservoir tube may correspond to a volume of a dose to be injected into the system 100 in connection with a cleaning process, high-level disinfecting process, and/or sterilizing process.

Figure 12:
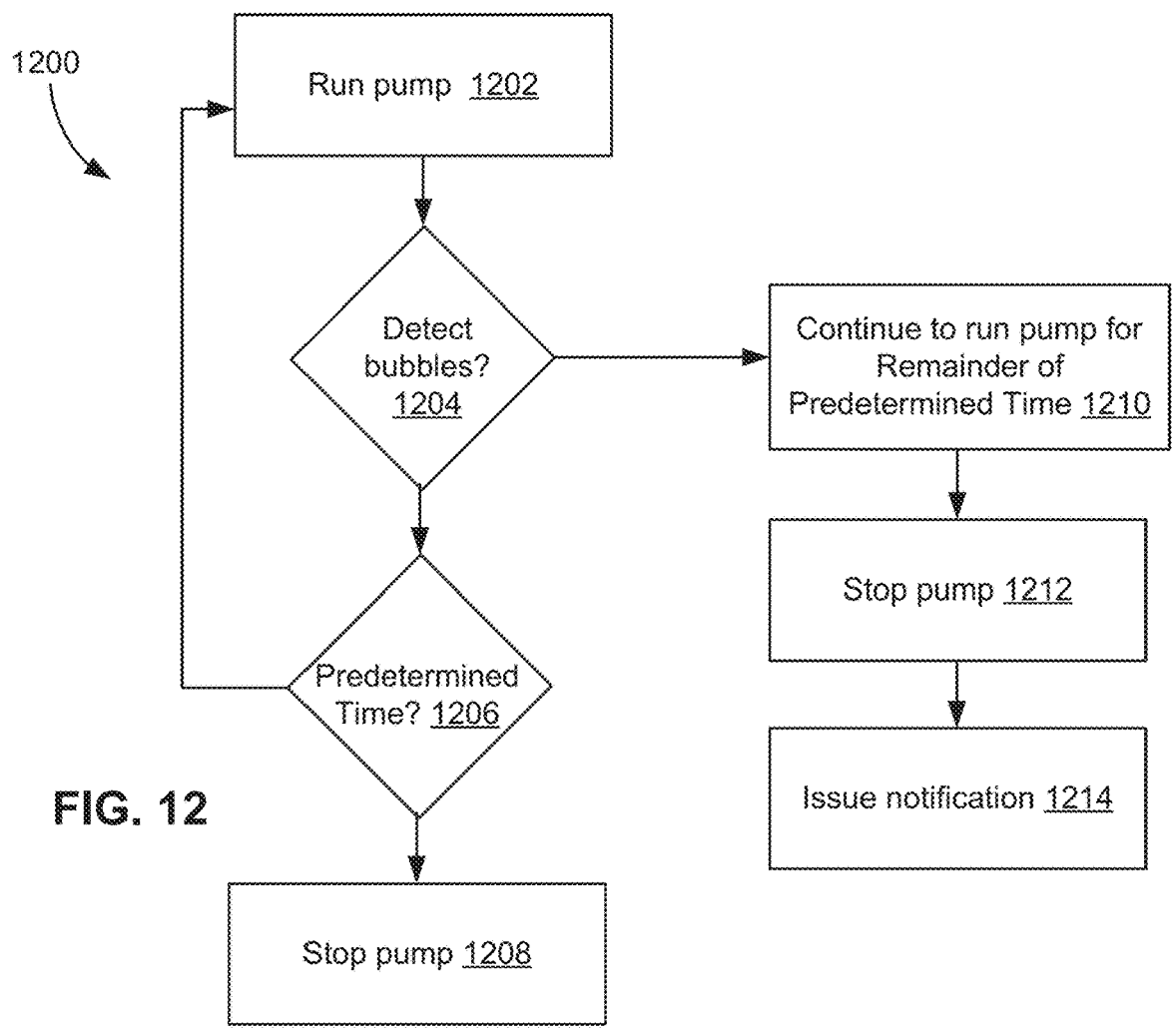
FIG. 12 is a flowchart showing an exemplary chemical dosing process.
Figure 13:
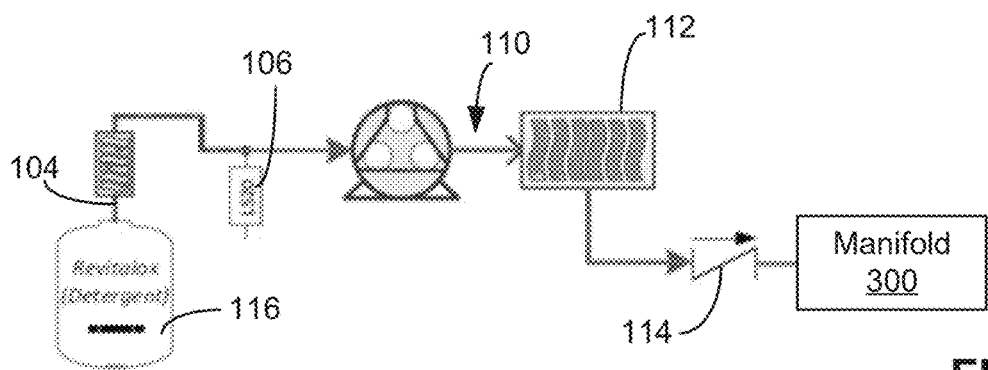
FIG. 13 is a schematic view showing exemplary state of fluid in the chemical dosing system.

FIG. 12 is a flowchart showing an exemplary operation 1200 of the chemical dosing system 102 and process for when bubbles are detected.

At step 1202, the pump is run, which results in the pulling of liquid from the container through the drawtube. As the liquid is pulled from the container, it displaces the liquid in the supply tube downstream the pump such that the liquid downstream the pump is pushed into the system (manifold).

The pump is run for a predetermined amount of time, which allows for a desired volume of liquid to be dosed into the system. In some embodiments, the desired volume is a volume of fluid equal to the volume of the tube downstream the pump up to the processor plumbing injection port, and the predetermined time is the amount of time for a volume of fluid equal to the volume of the tube downstream the pump up to the processor plumbing injection port to be pumped by the pump. The volume of the supply tube downstream the pump is displaced by the pump with additional fluid, while the volume previously in the tube is injected into the system.

When a standard cleaning cycle is run, the pump will run for a predetermined amount of time dosing a certain amount of chemistry into the plumbing. However, a given container has a defined volume of fluid that can be used in the chemical dosing process. Accordingly, after several rounds of chemical dosing, a situation will arise in which the container is emptied, and air bubbles are pulled into the system. FIG. 10 schematically shows the chemical dosing system 102 at the point where the container is empty and air bubbles have been drawn into the line. At the point where the chemistry container nears empty, this can occur (pump pulls air instead of fluid) at the end of the second to last dose. This would mean the air drawn in the drawtube has approached but not triggered the bubble detector. In this scenario the chemistry container is empty before the start of the last dosing cycle. When the last cycle is run, the bubble detector detects the air in the tube. This can alternatively occur (pump pulls air instead of fluid) at the beginning or sometime in the middle of the last dose.

Accordingly, at step 1204, it is determined whether air bubbles were detected during the run of the pump during the predetermined time. If no (N), the process proceeds to step 1206 where it is determined if the predetermined time has elapsed. If no (N), the process reverts to step 1202. If the predetermined time has elapsed (Y), the process proceeds to step 1208 and the pump is stopped.

If air bubbles are detected during the run of the pump during the predetermined time (Y), the process proceeds to step 1210 where the pump is run for the remainder of the predetermined time. By running the pump for the remainder of the predetermined time, the fluid (liquid and air) introduced into the tube downstream the pump displaces the liquid that was in the tube downstream the pump prior to the running of the pump, so the desired dosage is still delivered to the system. The pump continues to run for a predetermined time pulling air and pushing the chemistry that is in reservoir coil into the processor plumbing.

At step 1212, the pump is stopped.

At step 1214, the system notifies the user that the container is empty after the cycle is complete. Once the container is replaced, a priming process for filling an empty or partially empty tube (such as that described above with respect to FIG. 9) can be performed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A medical device processor, comprising:
a chemical dosing system, comprising:
   a supply tube extending along a length between a first end and a second end, the first end of the supply tube configured to receive a liquid;
   a pump coupled to the supply tube downstream from the first end and configured to pump fluid in the tube from the first end to the second end;
   a bubble detector coupled to the supply tube downstream from the first end, wherein an inner volume of the supply tube between the bubble detector and the second end is equal to or greater than a volume of a dose of liquid to be pumped from the chemical dosing system in a given dose; and
a controller coupled to the bubble detector and the pump, wherein the controller is configured to:
   run the pump for a predetermined period of time;
   detect the presence of one or more bubbles in the supply line during the predetermined time based on measurement by the bubble detector;
   upon detection of the presence of one or more bubbles in the supply line, continue to run the pump for the remainder of the predetermined time; and
   issue a notification to replace a source of the liquid after completion of the predetermined period time.

2. The medical device processor of claim 1, wherein the controller is further configured to:
   subsequent to receipt of notification that the source of the liquid has been replaced, run the pump until the presence of liquid is detected in the supply line based on measurement by the bubble detector;
   continue to run the pump for a second predetermined time upon detection of the presence of the liquid; and
   stop the pump upon completion of the second predetermined time.

3. The medical device processor of claim 1, further comprising a drawtube configured to be disposed in a container containing the liquid.

4. The medical device processor of claim 1, further comprising a removable container for configured to contain the fluid.

5. The medical device processor of claim 1, wherein the pump is downstream the bubble detector and arranged between the bubble detector and the second end.

6. The medical device processor of claim 1, wherein the pump is a peristaltic pump.

7. The medical device processor of claim 1, further comprising a reservoir coil in which a portion of the supply tube downstream the bubble detector is coiled.

8. The medical device processor of claim 7, wherein the reservoir coil is downstream the pump.

9. The medical device processor of claim 1, wherein an inner diameter of the supply tube is in a range of $1/16$ inch to $1/4$ inch.

10. The medical device processor of claim 1, further comprising:
   a manifold coupled to the second end of the chemical dosing system; and
   a basin coupled to the manifold.

11. The medical device processor of claim 10, wherein the controller is further configured to execute a cleaning cycle in which the chemical dosing system delivers a dose of liquid for the cycle.

12. The medical device processor of claim 10, wherein the controller is further configured to execute a high-level disinfection cycle in which the chemical dosing system delivers a dose of liquid for the cycle.

13. The medical device processor of claim 10, wherein the controller is further configured to execute a sterilization cycle in which the chemical dosing system delivers a dose of liquid for the cycle.

14. A method of providing a chemical dose from a chemical dosing system in a medical device processor, the chemical dosing system, comprising:
   a supply tube extending along a length between a first end and a second end, the first end of the supply tube configured to receive a liquid;
   a pump coupled to the supply tube downstream from the first end and configured to pump fluid in the tube from the first end to the second end;
   a bubble detector coupled to the supply tube downstream from the first end, wherein an inner volume of the supply tube between the bubble detector and the second end is equal to or greater than a volume of a dose of liquid to be pumped from the chemical dosing system in a given dose;
the method comprising:
   running the pump for a predetermined period of time;
   detecting the presence of one or more bubbles in the supply line during the predetermined time based on measurement by the bubble detector;
   upon detection of the presence of one or more bubbles in the supply line, continuing to run the pump for the remainder of the predetermined time; and
   issuing a notification to replace a source of the liquid after completion of the predetermined period time.

15. The method of claim 14, further comprising:
   subsequent to receipt of notification that the source of the liquid has been replaced, running the pump until the presence of liquid is detected in the supply line based on measurement by the bubble detector;
   continuing to run the pump for a second predetermined time upon detection of the presence of the liquid; and
   stopping the pump upon completion of the second predetermined time.

16. The method of claim 14, wherein the pump is downstream the bubble detector and arranged between the bubble detector and the second end.

17. The method of claim 14, further comprising a reservoir coil in which a portion of the supply tube downstream the bubble detector is coiled.

18. The method of claim 14, further comprising executing a cleaning cycle in which the chemical dosing system delivers a dose of liquid for the cycle.

19. The method of claim 14, further comprising executing a high-level disinfection cycle in which the chemical dosing system delivers a dose of liquid for the cycle.

20. The method of claim 14, further comprising executing a sterilization cycle in which the chemical dosing system delivers a dose of liquid for the cycle.

* * * * *